Sept. 19, 1950 L. J. SHERRY 2,523,067
ADJUSTABLE MOUNT FOR PHOTOGRAPHIC LENS ACCESSORIES
Filed June 18, 1948

INVENTOR.
LEO J. SHERRY,
BY
ATTORNEY

Patented Sept. 19, 1950

2,523,067

UNITED STATES PATENT OFFICE 2,523,067

ADJUSTABLE MOUNT FOR PHOTOGRAPHIC LENS ACCESSORIES

Leo J. Sherry, West Los Angeles, Calif.

Application June 18, 1948, Serial No. 33,843

12 Claims. (Cl. 88—57)

This invention relates to photography, and more particularly to a combined filter holder and sun shade for use with motion picture cameras of the turret head type.

An object of my present invention is to provide a mounting for a combined filter and sunshade or similar camera accessory, of the general character indicated, which constitutes an improvement over the accessory mount forming the subject matter of my co-pending application, Serial No. 758,787, filed July 3, 1947, now Patent No. 2,497,018, dated February 7, 1950.

A more detailed object of this invention is to provide means for mounting a combined filter and sun shade, or other accessory intended for use in cooperation with a photographic lens, which mounting is so disposed in front of the turret head of a camera having a plurality of lens barrel assemblies of different lengths that it can be used optionally with whichever one of the lens barrels being employed at the moment, and wherein the lens accessory is slidably mounted upon a telescopic supporting rod which permits much easier and more rapid adjustment in its effective length so as to adapt it for use in conjunction with a selected one of the lens barrel assemblies than can be attained with the slide rod disclosed in my aforesaid co-pending application, and which is comprised of several parts of different lengths, any one part or any combination of two or more parts of which may selectively be employed to form a rod of the desired length.

A further object is to provide a telescopic rod for the slidable support of a lens accessory of the character indicated which is rotatable about its own axis and with respect to the body of the camera on which it is mounted, which makes possible the rotational adjustment of the lens accessory, either into or out of its operating position in front of the lens being used.

A further object in this same connection is so to mount the lens accessory upon the slide rod that it is not rotatable with respect thereto about the rod's axis, and wherein the rod itself which is rotatable with respect to the camera body, as hereinabove indicated, is provided with means for releasably locking it in selected position of rotational adjustment so as to retain the lens accessory securely in its operating position against inadvertent displacement therefrom.

A further object is to provide an improvement in the mounting whereby the slide rod is secured in position upon the camera body, which improvement constitutes a safety feature inasmuch as it includes a relatively weak section which will break or bend should any undue lateral strain be imposed upon the slide rod or accessory carried thereby, and in this manner minimizes the danger of damaging any portion of the device other than the weak section, which can be repaired more easily or replaced less expensively.

A still further object of my present invention is to design the telescopic rod in such a manner that the outer portion of the rod upon which the lens accessory is slidable, is readily removable from the rod's inner portion, thus adding to the convenience with which the camera may be used when use of the accessory is not necessary or desirable, and yet leaving the rod's inner portion mounted in proper position upon the camera to receive the accessory with a minimum of delay and inconvenience whenever desired.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred forms within the scope of my invention as set forth in the claims.

Referring to the drawings.

Figure 1:
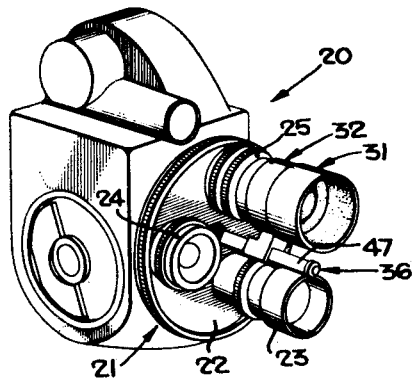
Figure 1 is a perspective view of a hand motion picture camera of the turret head type, with a combined lens shade and filter holder mounted thereupon in operative position by means of an accessory mount incorporating the principles of the present invention.
Figure 2:
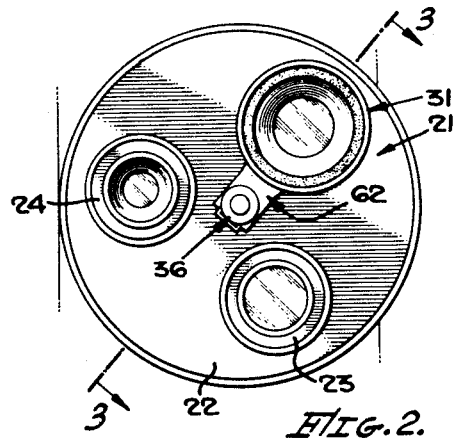
Figure 2 is an enlarged view in front elevation of the combined filter holder and sun shade and the mount therefor in position upon the turret head of the camera of Figure 1, portions of the figure being broken away to reduce its size.
Figure 3:
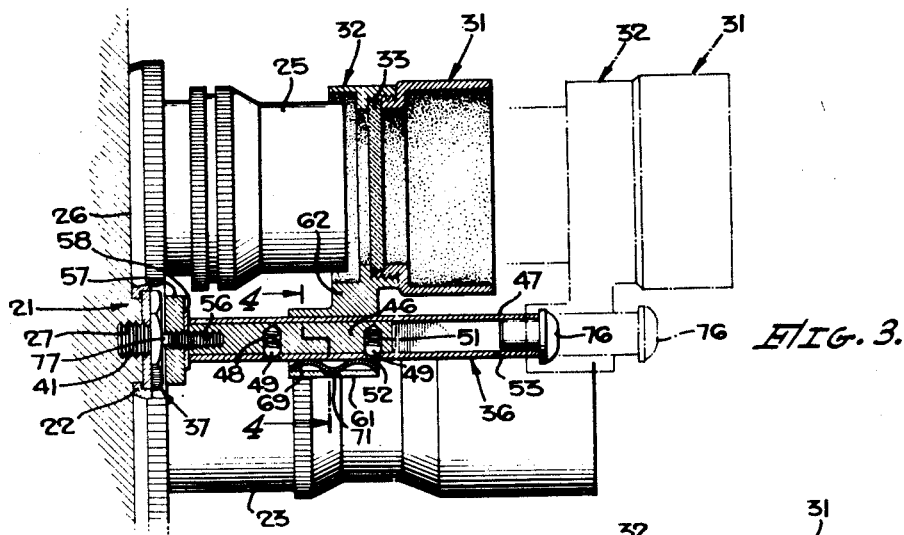
Figure 3 is a longitudinal sectional view taken upon the oblique plane indicated by the line 3—3 of Figure 2, with the direction of view as indicated.
Figure 4:
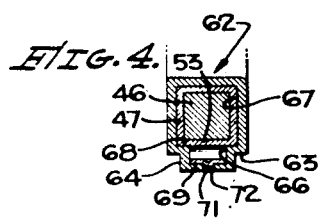
Figure 4 is a more highly enlarged view, taken in transverse section upon the line 4—4 of Figure 3, with the direction of view as indicated.
Figure 5:
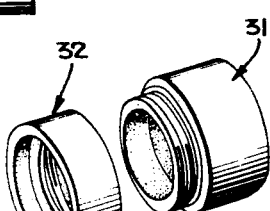
Figure 5 is an exploded perspective view of the lens accessory and its adjustable mount.
Figure 5:
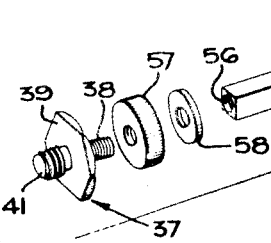

Referring to the drawing in detail, there is generally indicated at 20 a motion picture camera of any desired conventional type having a turret head 21, including a mounting plate 22, carrying long, short, and intermediate lens barrel assemblies 23, 24, and 25, respectively. The plate 22 of the turret head 21 is normally rotatably mounted in operative position on the front of the body 26 of the camera 20 by means of a turret head holding screw which is adapted to engage in a centrally-positioned threaded aperture 27 in the front of the body of the camera; but since the invention presently being described employs a mounting screw of altered design which replaces the mounting screw normally supplied with the camera, the normal mounting screw is not shown.

In operation of the device, the plate 22 is adapted to be rotated about the axis of the threaded aperture 27 until any selected one of the lens barrel assemblies 23, 24, or 25 is positioned in alignment with the photographic aperture of the camera.

It is conventional practice to use a lens accessory such as a filter, or a combined filter and sun shade, in cooperation with the lens being employed at any given time, and the present invention seeks to provide an improved and simplified support for such a lens accessory which makes it possible to use it in conjunction with whichever one of the lens barrel accessories 23, 24, 25 which at that time is being employed, and which disposes the accessory accurately and firmly in operative position in cooperation with that photographic lens so as to insure the accuracy of alignment and rigidity of support which are necessary for best results. Furthermore, the support is readily adjustable so as to permit the accessory optionally to be moved into or out of operative position with respect to the photographic lens being employed, and also so as to adapt the accessory to any one of the lens barrels 23, 24, 25, all of which are of different length.

With this object in view, the lens accessory which, in the modification illustrated, is in the form of a combined sun shade 31 and holder 32 for a photographic filter 33, is slidably mounted upon a telescopic rod 36 adapted to be mounted in front of the plate 22 of the turret head 21 and in co-axial alignment therewith. In accordance with the principles of the invention forming the subject matter of my aforementioned co-pending application, the slide rod 36 is mounted in this described position by means of the same screw as that which serves as the revoluble support of the plate 22 upon the camera body 21. Consequently, this screw, which is indicated at 37, is similar in design to that which is conventionally supplied with the camera for the purpose of securing the plate 22 thereupon, but the screw 37 is possessed of the added feature of a threaded shank 38 extending forward from the head 39 on the opposite side therefrom from the threaded shank 41 adapted to be received within the socket 27 in the camera body 26 and in co-axial alignment therewith.

The rod 36 comprises a plurality, preferably two, of sections 46 and 47, respectively, which are non-circular, preferably square, in cross section and which are so dimensioned that the smaller section 46 is slidable within the hollow interior of the larger section 47. Preferably a pair of spaced sockets 48 are formed in one of the faces of the smaller section 46, each of these sockets 48 containing a ball 49 pressed outwardly of its socket by a small coil spring 51 under compression between the bottom of the socket and the ball 49. The extreme outer end of each socket is of slightly smaller dimension than the ball 49 so as to retain the ball against being pressed completely out of its socket by its associated spring 51. However, each of the balls 49 is adapted to protrude far enough from the outer end of its socket to bear frictionally against the inner surface of the larger section 47 of the rod 36 so as to offer frictional resistance to the sliding telescopic movement of the sections with respect to each other.

A small opening 52 in that face 53 of the larger section 47 which is in slidable contact with the balls 49 serves as a locater to releasably anchor the two sections 46 and 47 in selected degree of telescopic extension by seating of one or the other of the balls 49 therein. However, the parts are preferably so proportioned that the tendency for either of the balls 49 to restrain the two sections 46 and 47 against movement with respect to each other can easily be overcome simply by exerting added pressure against the outer section 47, urging it to move longitudinally with respect to the inner section 46.

A socket or aperture 56 formed in the inner end of the smaller rod section 46 is threaded complementarily to the shank 38 of the holding screw 37, with the result that the telescopic rod 36 may be mounted upon the holding screw 37 in co-axial alignment therewith and, hence, co-axially with respect to the axis about which the turret head plate 22 rotates with respect to the camera body. Moreover, the rod 36 and the accessory carried thereby are also rotatable about that same axis by turning the section 46 of the rod upon the threads of the shank 38. In order to clamp the rod 36 and the accessory carried thereby in selected degree of rotational adjustment, a lock nut 57 is threaded onto the shank 38 between the head 39 of the screw 37 and the section 46 of the rod 36. Preferably, a washer 58 is imposed between the section 46 and the lock nut 57 so as to minimize any upsetting of the end of the section 46 when the lock nut 57 is tightened.

Since the sections 46 and 47 are not rotatable with respect to each other, owing to the non-circular nature of their interengaged portions, the outer or larger section 47 also is releasably retained against rotation about the axis of the rod 36 when the nut 57 is tightened. Furthermore, the outer surface of the larger section 47 also is non-circular, preferably square, in cross section, and the head 61 of the bracket 62 which mounts the lens accessory upon the rod 36 fits the outer surface of the larger section 47, with the result that while the head 61 of the bracket 62 is slidable longitudinaly along the section 47, it is not rotatable with respect thereto.

Thus it may be seen that when the lock nut 57 is tightened, pressing the washer 58 firmly against the inner end of the smaller rod section 46, the lens accessory, in this instance the filter 33 and sun shade 31, will be firmly and yet releasably anchored in selected position of angular adjustment about the axis of the rod 36, and consequently about the axis of rotation of the turret head 21.

Means are provided for establishing sufficient friction between the head 61 of the bracket 62 and the outer surface of the rod section 47 to insure that the bracket 62 would remain in that position upon the rod 36 to which it is intentionaly shifted, and yet permit facile sliding of the bracket along the rod 36 when the operator prefers to alter its position thereupon. Preferably in that face 63 of the head 61 which is opposite the bracket 62, an extension 64 is formed, providing a recess 66 communicating with the bore 67 of the head 61 within which the section 47 of the rod 36 is slidable. This recess 66, however, is narrower than the bore 67, with the result that the shoulders 68 remaining at the sides of the recess 66 make frictional engagement with the associated face of the rod section 47 and thereby retain the head 61 against rocking movement about a transverse axis and with respect to the rod 36.

A leaf spring 69 seated within the recess 66 is bowed preferably so that its ends bear frictionally against the associated face of the rod section 47, with its mid portion pressing outwardly against the outer face of the recess 66. A dimple 71 formed in the mid section of the leaf spring 69 seats within a socket 72 in the extension 64 so as to retain the leaf spring 69 in operative position within the recess 66.

A head 76 of any suitable design and type is provided at the outer end of the outer rod section 47 so as to prevent accidental withdrawal of the head 61 of the bracket 62 from the outer end of the rod 36.

As a safety feature, I prefer that the shank 38 of the anchoring screw 37 be formed with a reduced section 77 at its base. This reduced section 77 is sufficiently smaller in cross sectional area than the remainder of the shank 38 that should any excess force be exerted laterally against the rod 36, this reduced section 77 will bend or break before any other portion of the entire device. In this manner, assurance is provided against damage to the lens accessory, to the mounting slide rod therefor, or to the body of the camera itself.

In operation of the camera, if the operator wishes to use any one of the three lens barrel assemblies 23, 24, 25 without benefit of the filter and sun shade, it is necessary merely for him to turn the turret head in such a manner as to bring the selected lens barrel assembly into operative position before the camera's aperture and then, after loosening the lock nut 57, to swing the filter 33 and sun shade 31 laterally until it is out of alignment with that selected lens barrel.

When the shortest lens barrel assembly 24 is being employed and the operator desires to use the filter 33 and sun shade 31, the lock nut 57 should be loosened away from the section 46, which will permit the slide rod 36 and the accessory carried thereby to be rotated until the filter 33 and sunshade 31 are in axial alignment with the lens barrel 24. The operator then slides the outer section 47 of the telescopic rod 36 to its minimum length, and the bracket 62 may then be slid inwardly upon the slide rod 36 until the inner face of the filter holder 32 bears against the outer face of the lens barrel 24. Any inaccuracy of the alignment of the filter holder and the sun shade with the lens barrel 24 may then easily be overcome by loosening the lock nut 57 and turning the rod 36 slightly.

Should the operator then desire to use another of the lens barrels, say the intermediate lens barrel 25, he should first slide the bracket 62 outwardly to the outer end of the slide rod 36. This will establish suitable clearance for the lens barrel 25 of intermediate length to be rotated into operative position before the camera aperture and without disturbing the accuracy of the alignment of the filter 33 and sun shade 31, with the result that the bracket 62 may be slid back upon the rod 36 until the inner face of the filter holder 32 bears against the outer end of the lens barrel 25. Here again, any lack of accuracy of alignment of the accessory with the lens barrel being used may be overcome rapidly in the obvious manner.

In order to permit use of the longest lens barrel assembly 23, the operator should first slide the section 47 outwardly upon the slide rod 36 until the outer spring-pressed ball 49 seats within the socket 52, thus extending the telescopic rod 36 to its greatest length, then, with the bracket 62 at or adjacent its extreme outer position upon the slide rod 36, the turret head 21 may be turned to bring the longest lens barrel 23 into operative position. If any appreciable space then remains between the outer end of the lens barrel 23 and the filter holder 32, the bracket 62 should be slid inwards upon the slide rod 36 until that space is taken up.

I claim:

1. As a new article of manufacture, an accessory for a camera having a body, a turret head holding screw aperture therein, a turret head, and a plurality of lens barrel assemblies carried by said turret head, said accessory comprising a slide rod, a screw comprising a head and two shanks extending from opposite sides of said head, one of said shanks being receivable within said holding screw aperture to mount said turret head on said body for rotational adjustment, said slide rod being receivable on the other of said shanks for rotational adjustment with respect thereto whereby said slide rod is rotatable about its own axis without disturbing said screw, a holder for a lens accessory, and means on said rod slidably supporting said holder.

2. As a new article of manufacture, an accessory for a camera having a body, a turret head holding screw aperture therein, a turret head, and a plurality of lens barrel assemblies carried by said turret head, said accessory comprising a screw secured within said aperture and revolubly mounting said turret head upon said body, a slide rod, means for mounting said slide rod upon said screw in coaxial alignment therewith and for rotational adjustment with respect to said screw whereby said slide rod is rotatable about its own axis without disturbing said screw, and a holder for a lens accessory slidably mounted on the said rod.

3. As a new article of manufacture, an accessory for a camera having a body, a turret head holding screw aperture therein, a turret head, and a plurality of lens barrel assemblies carried by said turret head, said accessory comprising a screw secured within said aperture and revolubly mounting said turret head upon said body, a slide rod, means for mounting said slide rod upon said screw in coaxial alignment therewith and for rotational adjustment with respect thereto whereby said slide rod is rotatable about its own axis without disturbing said screw, releasable means for locking said slide rod in selected position of rotation about its own axis, a filter holder, and means slidably mounting said filter holder on said slide rod for axial sliding motion with respect thereto, said mounting means also serving to hold the said filter holder against the rotational movement with respect to said slide rod.

4. As a new article of manufacture, an accessory for a camera having a body, a turret head holding screw aperture therein, a turret head, and a plurality of lens barrel assemblies carried by said turret head, said accessory comprising a screw secured within said aperture and revolubly mounting said turret head upon said body, a slide rod comprising a plurality of telescopically interconnected sections, the interengaging portions of said sections being of non-circular cross section to prevent them from turning with respect to each other, means for mounting the innermost of said sections upon said screw in coaxial alignment therewith and for rotational adjustment about their common axis, releasable means for locking said innermost section in selected degree of rotational adjustment about said axis, and a filter holder slidably mounted on the outermost of said sections.

5. As a new article of manufacture, an accessory for a camera having a body, a turret head holding screw aperture therein, a turret head, and a plurality of lens barrel assemblies carried by said turret head, said accessory comprising a screw secured within said aperture and revolubly mounting said turret head upon said body, a slide rod comprising a plurality of telescopically interconnected sections, the interengaging portions of said sections being of non-circular cross section to prevent them from turning with respect to each other, means for mounting the innermost of said sections upon said screw in coaxial alignment therewith and for rotational adjustment about their common axis, releasable means for locking said innermost section in selected degree of rotational adjustment about said axis, and a filter holder comprising a bracket slidably mounted on the outermost of said sections of said telescopic rod and a filter-receiving ring carried by said bracket, the interengaging portions of said bracket and said outermost section of said telescopic rod being of non-circular cross section to prevent them from turning with respect to each other.

6. As a new article of manufacture, an accessory for a camera having a body, a turret head holding screw aperture therein, a turret head, and a plurality of lens barrel assemblies carried by said turret head, said accessory comprising a screw secured within said aperture and revolubly mounting said turret head upon said body, a slide rod comprising a plurality of telescopically interconnected sections, the interengaging portions of said sections being of non-circular cross section to prevent them from turning with respect to each other, means for mounting the innermost of said sections upon said screw in coaxial alignment therewith and for rotational adjustment about their common axis, releasable means for locking said innermost section in selected degree of rotational adjustment about said axis, the outside of the outermost of said sections of said telescopic rod being of non-circular cross section, and a filter holder comprising a bracket having an aperture in its inner end of cross section complementary to that of the outside of said outermost rod section and within which said outermost rod section is slidably fitted, and a filter-holding ring on the outer end of said bracket.

7. As a new article of manufacture, an accessory for a camera having a body, a turret head holding screw aperture therein, a turret head, and a plurality of lens barrel assemblies carried by said turret head, said accessory comprising a screw secured within said aperture and revolubly mounting said turret head upon said body, a slide rod comprising a plurality of telescopically interconnected sections, the interengaging portions of said sections being of non-circular cross section to prevent them from turning with respect to each other, means for mounting the innermost of said sections upon said screw in coaxial alignment therewith and for rotational adjustment about their common axis, releasable means for locking said innermost section in selected degree of rotational adjustment about said axis, the outside of the outermost of said sections of said telescopic rod being of non-circular cross section, a filter holder comprising a bracket having an aperture in its inner end of cross section complementary to that of the outside of said outermost rod section and within which said outermost rod section is slidably fitted, spring-pressed friction means yieldably retaining said bracket in selected degree of sliding adjustment along said outermost section of said telescopic rod, and a filter-holding ring on the outer end of said bracket.

8. As a new article of manufacture, an accessory for a camera having a body, a turret head holding screw aperture therein, a turret head, and a plurality of lens barrel assemblies carried by said turret head, said accessory comprising a slide rod, a screw receivable within said holding screw aperture of said camera body, means on said screw for mounting said turret head on said body for rotational adjustment with respect thereto, means on said screw for mounting said slide rod thereon in coaxial alignment therewith, means for releasably locking said rod to said screw in selected degree of rotational adjustment with respect thereto about their common axis, and a filter holder comprising a bracket carried by said rod and extending radially therefrom and a filter-receiving ring carried by said bracket.

9. As a new article of manufacture, an accessory for a camera having a body, a turret head holding screw aperture therein, a turret head, and a plurality of lens barrel assemblies carried by said turret head, said accessory comprising a slide rod, a screw receivable within said holding screw aperture of said camera body, means on said screw for mounting said turret head on said body for rotational adjustment with respect thereto, means on said screw for mounting said slide rod thereon in coaxial alignment therewith, means for releasably locking said rod to said screw in selected degree of rotational adjustment with respect thereto about their common axis, and a filter holder comprising a bracket slidably mounted on said rod for movement longitudinally therealong, means restraining said bracket against rotary movement with respect to said rod, and a filter-receiving ring carried by said bracket.

10. As a new article of manufacture, an accessory for a camera having a body, a turret head holding screw aperture therein, a turret head, and a plurality of lens barrel assemblies carried by said turret head, said accessory comprising a slide rod, a screw receivable within said holding screw aperture of said camera body, means on said screw for mounting said turret head on said body for rotational adjustment with respect thereto, means on said screw for mounting said slide rod thereon in coaxial alignment therewith, means for releasably locking said rod to said screw in selected degree of rotational adjustment with respect thereto about their common axis, and a filter holder comprising a bracket slidably mounted on said rod for movement longitudinally therealong, means restraining said bracket against rotary movement with respect to said rod, spring-pressed friction means yieldably retaining said bracket in selected degree of sliding adjustment along said rod, and a filter-receiving ring carried by said bracket.

11. As a new article of manufacture, an accessory for a camera having a body, a turret head holding screw aperture therein, a turret head, and a plurality of lens barrel assemblies carried by said turret head, said accessory comprising a slide rod having a threaded socket in one end thereof, a screw comprising a head and a pair of axially aligned threaded shanks extending in opposite directions from said head, one of said shanks being receivable within said holding screw aperture to mount said turret head on said camera body for rotational adjustment with respect thereto, the other of said shanks being receivable within said slide rod's socket, means for releasably locking said rod to said screw in selected degree of rotational adjustment with respect thereto about their common axis, and a lens accessory holder comprising a bracket slidably mounted on said rod for movement longitudinally therealong, means restraining said bracket against rotary movement with respect to said rod, spring-pressed friction means yieldably retaining said bracket in selected degree of sliding adjustment along said rod, and means for mounting a lens accessory on said bracket.

12. As a new article of manufacture, an accessory for a camera having a body, a turret head holding screw aperture therein, a turret head, and a plurality of lens barrel assemblies carried by said turret head, said accessory comprising a slide rod having a threaded socket in one end thereof, a screw comprising a head and a pair of axially aligned threaded shanks extending in opposite directions from said head, one of said shanks being receivable within said holding screw aperture to mount said turret head on said camera body for rotational adjustment with respect thereto, the other of said shanks being receivable within said slide rod's socket, said other shank having a section of reduced cross sectional area therein adjacent said head, means for releasably locking said rod to said screw in selected degree of rotational adjustment with respect thereto about their common axis, and a lens accessory holder comprising a bracket slidably mounted on said rod for movement longitudinally therealong, means restraining said bracket against rotary movement with respect to said rod, spring-pressed friction means yieldably retaining said bracket in selected degree of sliding adjustment along said rod, and means for mounting a lens accessory on said bracket.

LEO J. SHERRY.

REFERENCES CITED

The following references are of record in the file of this patent:

UNITED STATES PATENTS

| Number | Name | Date |
| --- | --- | --- |
| 407,192 | Frost | July 16, 1889 |
| 488,258 | Williams et al. | Dec. 20, 1892 |
| 953,879 | Williams | Apr. 5, 1910 |
| 1,754,282 | Owens | Apr. 15, 1930 |
| 1,767,849 | Howell | June 24, 1930 |
| 1,818,062 | Howell | Aug. 11, 1931 |
| 1,885,102 | Azarraga | Nov. 1, 1932 |
| 1,991,814 | Mitchell | Feb. 19, 1935 |